(No Model.)
H. McKAY.
TOOTHPICK CASE.
No. 469,064. Patented Feb. 16, 1892.
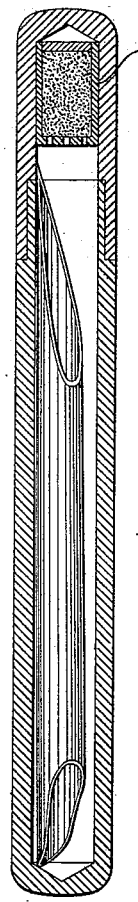
Fig. 3.
Fig. 4.
Fig. 1.
Fig. 2.
Witnesses:
Edward F. Allen.
Fred S. Greenleaf.
Inventor:
Hiram McKay,
by Crosby & Gregory
attys.

UNITED STATES PATENT OFFICE.

HIRAM McKAY, OF BOSTON, MASSACHUSETTS.

TOOTH-PICK CASE.

SPECIFICATION forming part of Letters Patent No. 469,064, dated February 16, 1892.

Application filed May 18, 1891. Serial No. 393,153. (No model.)

*To all whom it may concern:*

Be it known that I, HIRAM McKAY, of Boston, county of Suffolk, State of Massachusetts, have invented an Improvement in Tooth-Pick Cases, of which the following description, in connection with the accompanying drawings, is a specification, like letters on the drawings representing like parts.

This invention has for its object to construct a perfumed tooth-pick case.

My invention comprehends the employment of a tubular or other shell closed at one end to receive or contain one or more tooth-picks and a cap adapted to fit on the open end of said shell, which is recessed, and which is supplied with perfumed material held therein by a suitable perforated holder, said cap and shell thereby forming a tight case.

Figure 1 shows in vertical section a perfumed tooth-pick case embodying this invention; Fig. 2, a detail of the holder; Fig. 3, a vertical section of a modified form of tooth-pick case; Fig. 4, a detail of the holder shown in Fig. 3.

The shell or case $a$ is made tubular and closed at one end, as shown, and is made of hard rubber, celluloid, or other suitable material, and of suitable size to receive and contain one or more tooth-picks. A cap $b$ is provided for closing the open end of the shell $a$, which is recessed, and perfumed material $c$ is contained in said recessed cap.

As shown in Fig. 1, the perfumed material is placed directly in the recess in the cap, and a perforated disk $d$ of suitable size and shape is forced into said recess against the material, which acts to hold the said material in place.

As represented in Fig. 3, the perfumed material is contained in a small holder $d$, having a perforated bottom plate, the material being held in place in the holder by a small piece of felt or equivalent material.

The holder may be made of soft rubber or equivalent material, which will have a tendency to assist in holding itself in the recessed cap. This holder may readily be removed and fresh perfumed material supplied.

The cap $b$, provided with the perfumed material, is placed on the open end of the shell $a$, containing the tooth-picks, to thereby form a tight case, so that the tooth-picks placed therein may become perfumed.

The tooth-pick case herein shown and described can be readily carried in the pocket, and is a very desirable article, as it not only furnishes perfumed tooth-picks, but also protects the pocket from the action of the sharp points of the tooth-picks, which may be carried unprotected in the pocket.

I do not desire to limit my invention to any particular form of holder for the perfumed material.

I claim—

The tooth-pick case herein described, consisting of a tubular shell or case closed at one end to receive the tooth-picks, a recessed cap adapted to fit on and close the open end of said shell, perfumed material contained within said cap, and a holder for said material, substantially as described.

In testimony whereof I have signed my name to this specification in the presence of two subscribing witnesses.

HIRAM McKAY.

Witnesses:
BERNICE J. NOYES,
EDWARD F. ALLEN.